United States Patent
Elliott et al.

(10) Patent No.: US 6,967,971 B1
(45) Date of Patent: *Nov. 22, 2005

(54) METHOD AND SYSTEM FOR PROVIDING AN INTEGRATED FUNCTIONAL TOPOLOGY FOR WIRELESS AND WIRELINE COMMUNICATION NETWORKS

(75) Inventors: Stephen B. Elliott, Allen, TX (US); Kalyan K. Basu, Plano, TX (US); Dave Lauson, Pittsburg, TX (US); Jerry Mizell, Plano, TX (US); Stone Tseng, Plano, TX (US)

(73) Assignee: Nortel Networks Limited, St. Laurent (CA)

( * ) Notice: Subject to any disclaimer, the term of this patent is extended or adjusted under 35 U.S.C. 154(b) by 0 days.

This patent is subject to a terminal disclaimer.

(21) Appl. No.: 09/436,008

(22) Filed: Nov. 9, 1999

(51) Int. Cl.[7] .............................. H04J 3/16; H04J 3/22
(52) U.S. Cl. ....................... 370/466; 370/467; 370/395
(58) Field of Search ................................ 370/395, 328, 370/252, 400, 310.2, 466, 352, 353, 354, 370/355, 349, 310.1, 316, 319–321, 337, 370/342, 344, 347, 431, 442, 441, 465, 467, 370/469, 401, 398, 235, 230, 231; 455/426, 455/552, 553; 709/232, 226, 244

(56) References Cited

U.S. PATENT DOCUMENTS

| | | | | |
|---|---|---|---|---|
| 5,521,906 A | * | 5/1996 | Grube et al. ................. | 370/252 |
| 5,533,008 A | * | 7/1996 | Grube et al. ................. | 370/252 |
| 5,638,371 A | * | 6/1997 | Raychaudhuri et al. .. | 370/310.2 |
| 5,742,772 A | * | 4/1998 | Sreenan ....................... | 709/226 |
| 5,764,644 A | * | 6/1998 | Miska et al. ................. | 370/465 |
| 5,793,753 A | * | 8/1998 | Hershey et al. ............. | 370/252 |
| 6,052,371 A | * | 4/2000 | Lemieux ..................... | 370/338 |
| 6,205,143 B1 | * | 3/2001 | Lemieux ................ | 370/395.61 |
| 6,208,659 B1 | * | 3/2001 | Govindarajan et al. ..... | 370/410 |
| 6,278,697 B1 | * | 8/2001 | Brody et al. ................. | 370/310 |
| 6,327,267 B1 | * | 12/2001 | Valentine et al. ........... | 370/466 |
| 6,353,609 B1 | * | 3/2002 | Ethridge et al. ............. | 370/352 |
| 6,385,203 B2 | * | 5/2002 | McHale et al. ............. | 370/401 |
| 6,434,139 B1 | * | 8/2002 | Liu et al. ..................... | 370/352 |

(Continued)

OTHER PUBLICATIONS

U.S. Appl. No. 09/404,515, filed Sep. 23, 1999, Stephen B. Elliott, Related Co-Pending Application.

(Continued)

*Primary Examiner*—Wellington Chin
*Assistant Examiner*—Jamal A. Fox
(74) *Attorney, Agent, or Firm*—John D. Crane; Dillon & Yudell LLP

(57) ABSTRACT

An asynchronous transfer mode infrastructure is integrated with the communications network. The asynchronous transfer mode infrastructure is composed of an asynchronous transfer mode fabric and asynchronous transfer mode gateway. Wireless and wireline data are linked to the communications network via the asynchronous transfer mode infrastructure, such that all wireless and wireline data transactions within the communications network are processed independently of any switching devices present within the communications network. Wireless and wireline data is transmitted to and from the communications network via a network access function that allows wireless and wireline data to flow to and from the communications network. The wireless and wireline data is converted within the network access function in response to transmittal of the wireless and wireline data to the network access function. The wireless and wireline data is then transferred to the asynchronous transfer mode infrastructure from the network access function.

9 Claims, 5 Drawing Sheets

U.S. PATENT DOCUMENTS

| | | | |
|---|---|---|---|
| 6,473,097 B1 * | 10/2002 | Elliott | 715/733 |
| 6,618,384 B1 * | 9/2003 | Elliott | 370/396 |
| 6,631,120 B1 * | 10/2003 | Milbrandt | 370/252 |
| 6,633,545 B1 * | 10/2003 | Milbrandt | 370/252 |
| 6,778,517 B1 * | 8/2004 | Lou et al. | 370/338 |

OTHER PUBLICATIONS

U.S. Appl. No. 09/406,317, filed Sep. 27, 1999, Stephen B. Elliott, Related Co-Pending Application.

U.S. Appl. No. 09/414,181, filed Oct. 7, 1999, Stephen B. Elliott, et al., Related Co-Pending Application.

* cited by examiner

METHOD AND SYSTEM FOR PROVIDING AN INTEGRATED FUNCTIONAL TOPOLOGY FOR WIRELESS AND WIRELINE COMMUNICATION NETWORKS

RELATED APPLICATIONS

The present application is related to the subject matter of the following applications: Ser. No. 09/404,515 entitled "Method and Apparatus for Providing a Mobile Switching Center Intranet Function: and filed Sep. 23, 1999 and now U.S. Pat. No. 6,473,097 dated Oct. 29, 2002; Ser. No. 09/436,008 entitled "Method and System for Providing an Integrated Functional Topology for Wireless and Wireline Communication Networks" and filed Nov. 9, 1999; Ser. No. 09/406,317 "Integration of ATM Edge Switch with Access Device" and filed Sep. 27, 1999; and Ser. No. 09/414,181 "Method and System for Next Generation Wireless Network Access Function" and filed Oct. 7, 1999. The content of the above-referenced applications is incorporated herein by reference.

BACKGROUND OF THE INVENTION

1. Technical Field

The present invention relates in general to an improved communications system. In particular, the present invention relates to an improved communications system in which landline (wireline) and mobile communication devices are utilized to initiate communication transactions. More particularly, the present invention relates to an improved communications system in which wireless and wireline access infrastructures are fully integrated. Still more particularly, the present invention relates to cellular communication networks that incorporate both wireline and wireless features.

2. Description of the Related Art

Communication networks, such as wireless and wireline telephone systems, are well-known. A typical wireline based communications system utilizes a physical path to transmit signals. Such wireline systems are also referred to as "landline" systems. Examples of wireline communications systems include telephone, telegraph, facsimile, closed circuit television and so forth. Examples of wireless communication systems include cellular telephone systems. A cellular telephone system, in particular, includes cellular subscriber units that can be mobile or portable, and cellular base stations which are connected to the public telephone company via one or more cellular switching networks. Each cellular subscriber has an assigned cellular telephone number which allows the user (i.e., the cellular subscriber) to place and receive calls within a widespread range of the cellular base stations, such as throughout a metropolitan area.

Computerized switching is essential to the operation of both wireline and wireless telephone communication systems. Telephone communication networks typically provide features for redirecting calls on behalf of telephone users. Examples of such features include call forwarding, call transfer, release link trunking, and simultaneous ringing, all well known in the communications arts. Call forwarding, for example, is a network-provided service feature in which calls may be redirected from an originally called address to another address specified by a call forwarding party.

A problem associated with such telephone communication networks is the inability to successfully integrate wireless and wireline access infrastructures present within such communication networks. Presently, wireless and wireline networks are distinct and defined by the switching system on which they are based. Wireless and wireline infrastructures are largely separate. Those communication networks which incorporate aspects of both wireless and wireline networks often face difficult switching choices. In such communication networks, switch centric dependencies are evident. What is needed to create a truly integrated wireless/wireline network is a topology that supports a generic infrastructure independent of switching and access technologies. Such infrastructures presently do not exist. Classical wireline and wireless operators are currently merging. However, without a smooth switching infrastructure in place, such systems are largely expensive and inefficient to operate.

Another problem encountered in such communication networks is the inability of such networks to support a variety of air/wire access standards. Typically, a communications network relies on one air/wire access standard. In order to support a variety of air/wire access standards, a combined wireline/wireless infrastructure having the ability to support multiple standards is needed. By solving these problems, which to date have not been adequately addressed in the communication networking arts, an integrated wireless and wireline access infrastructure would be achieved, which would be advantageous to both consumers and operators of communication networks. Such communication networks are also faced with an explosion in the demand for bandwidth in both wireline and wireless marketplaces. Fiber optic and coaxial-based technologies, in association with broadband wireless access technologies are emerging. However, present wireless and wireline infrastructures simply are incapable of supporting this bandwidth demand without major reconstruction.

Additionally, asynchronous transfer mode (ATM) has reached the critical point of acceptance. Asynchronous transfer mode is a communications protocol that promotes the transmission of voice, data, image, and video signals over wide-area high-bandwidth communications systems. ATM typically provides fast packet switching in which information is inserted in small, fixed-size cells (32 to 130 octets) that are multiplexed and switched in a slotted operation, based upon header content, over a virtual circuit established upon request for service. Investment in the construction of ATM networks is growing rapidly. Many of the largest wireline and wireline customers in existence have large and growing ATM networks. Integration of their wireless/wireline networks into their ATM fabric (physical structure of the network where generally, physical/logical communications channels connect port-to-port seamlessly) is simply a natural progression of present trends. However, without an efficient wireless/wireline access infrastructure available, even ATM networks are limited in their expansion. With an efficient/wireless access infrastructure available, ATM networks could expand even further.

Based on the foregoing, it can be appreciated that a need exists for a functional topology for integrated wireless/wireline networks. Such a need is met by the invention described herein.

SUMMARY OF THE INVENTION

It is therefore one object of the present invention to provide an improved communications system.

It is therefore another object of the present invention to provide an improved communications system in which wireless and wireline communication devices can be utilized to initiate communication transactions.

It is yet another object of the present invention to provide an improved communications system in which wireless and wireline features are fully integrated with the communications system via an ATM infrastructure.

The above and other objects are achieved as is now described. A method and system for efficiently integrating wireless and wireline functions utilizing an ATM infrastructure within a communications network. The ATM infrastructure is composed of an ATM fabric and an ATM gateway. Wireless and wireline data are linked to the communications network via the ATM infrastructure, such that all wireless and wireline data transactions within the communications network are processed independently of any switching devices present within the communications network. Wireless and wireline data is transmitted to and from the communications network via a network access function that allows wireless and wireline data to flow to and from the communications network. The wireless and wireline data is consolidated within the network access function in response to transmittal of the wireless and wireline data to the network access function. The wireless and wireline data is transferred to the ATM infrastructure from the network access function, in response to consolidating the wireless and wireline data within the network access function.

BRIEF DESCRIPTION OF THE DRAWINGS

The novel features believed characteristic of this invention are set forth in the appended claims. The invention itself, however, as well as a preferred mode of use, further objects, and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
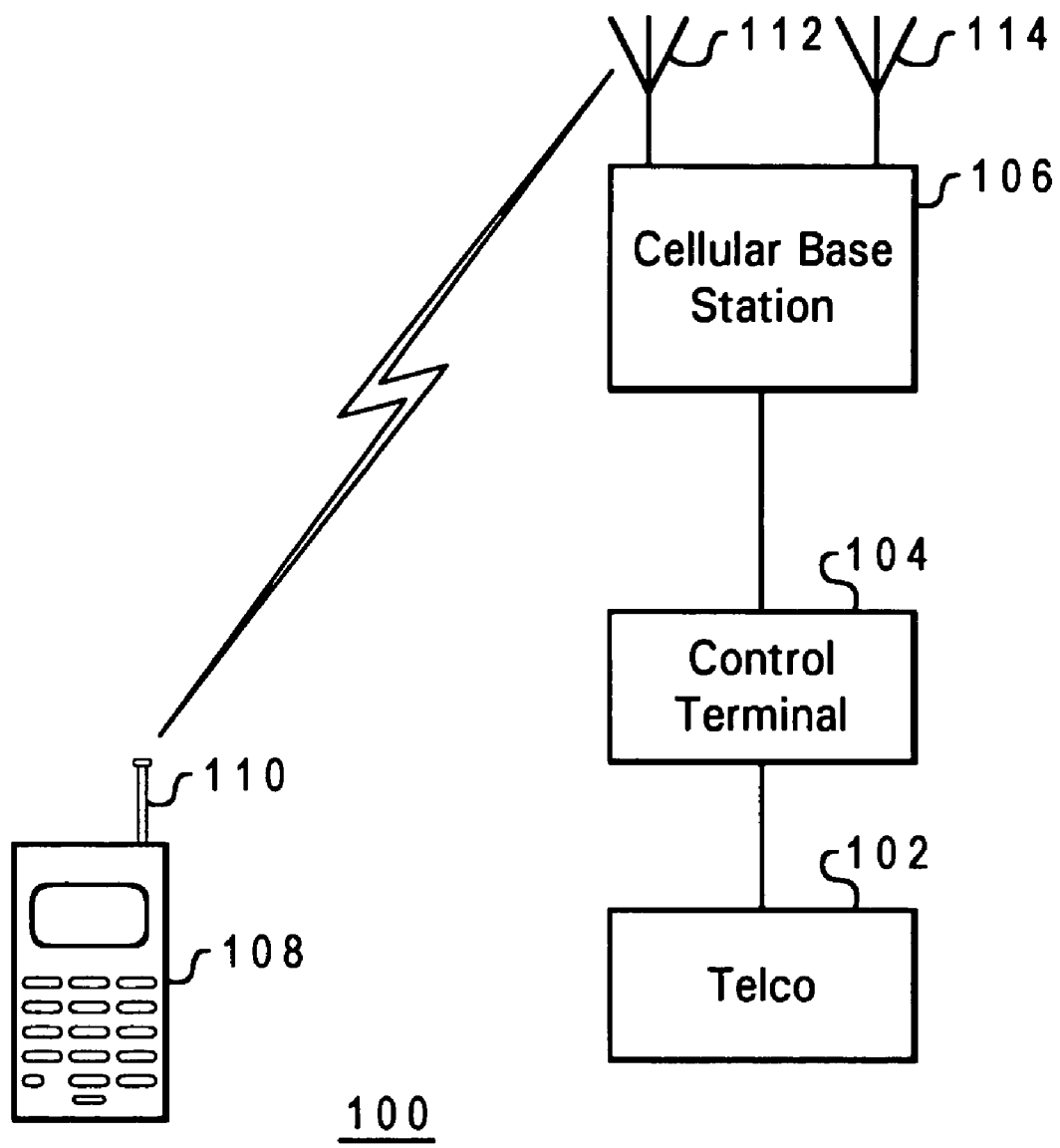
FIG. 1 depicts a block diagram of a cellular telephone system in which a preferred embodiment of the present invention can be implemented.

With reference now to the figures and in particular with reference to FIG. 1, a block diagram of a cellular telephone system 100 in which a preferred embodiment of the present invention may be implemented is depicted. The cellular telephone system 100 depicted in FIG. 1 includes a telephone company phone system (TELCO) 102, connected by telephone landlines to a control terminal 104 which in turn is coupled, also by telephone landlines, to a cellular base station 106 located in a cell of a mobile cellular telephone system. Those skilled in the art will appreciate that cellular telephone system 100 is one type of a communications system which may be utilized in accordance with a preferred embodiment of the present invention. For example, non-cellular, wireline and other such implemented telephone systems may be utilized in accordance with a preferred embodiment of the present invention. Cellular telephone system 100 as described herein is presented for illustrative purposes only.

Cellular telephone 108 communicates with cellular base station 106 via antennas 110 and 112. Antennas 110 and 112 can be implemented as telescopic whip antennas that extend or retract (i.e., lengthen or shorten), by being constructed in the form of overlapping concentric cylinders that slide inside of each other and make electrical contact with each other. It will be appreciated by those skilled in the art that such antennas are, of course, only examples of antennas that can be utilized with a cellular telephone system such as cellular telephone system 100. A wide variety of other antennae can also be utilized in conjunction with a wireless communication system such as cellular telephone system 100. Also, landlines utilized in association with cellular telephone system 100 are lines that can be placed in areas on land or inland waterways, and can include twisted-pair lines, coaxial cables, and fiber optic cables utilized in overhead, direct buried, underground, microwave, and satellite applications.

Additional cellular base stations may be located throughout a geographic area to provide telephone service to cellular telephones 108. Cellular base station 106 incorporates both a receiver antenna 112 and a transmitter antenna 114 for communicating with cellular telephones 108. Cellular telephone 108 may be a mobile-unit installed in a vehicle, a transportable unit which is a mobile-unit and battery installed in a carrying case, or a hand-held portable unit. Cellular telephone 108 includes an antenna 112 for the cellular radio channels. Those skilled in the art will recognize that cellular communications may be accomplished by means other than a handheld cellular telephone including automobile mounted cellular telephones, wireless modems and the like.

In the United States, cellular communications take place utilizing at least three different frequency modulation schemes including Time Division Multiple Access (TDMA), Call Division Multiple Access (CDMA) and Global System for Mobile communications (GSM). A cellular telephone operating with CDMA cannot generally access a TDMA or a GSM telephone without extensive modulation conversion. All of the above modulation schemes can be utilized in accordance with a preferred embodiment of the present invention.

Figure 2:
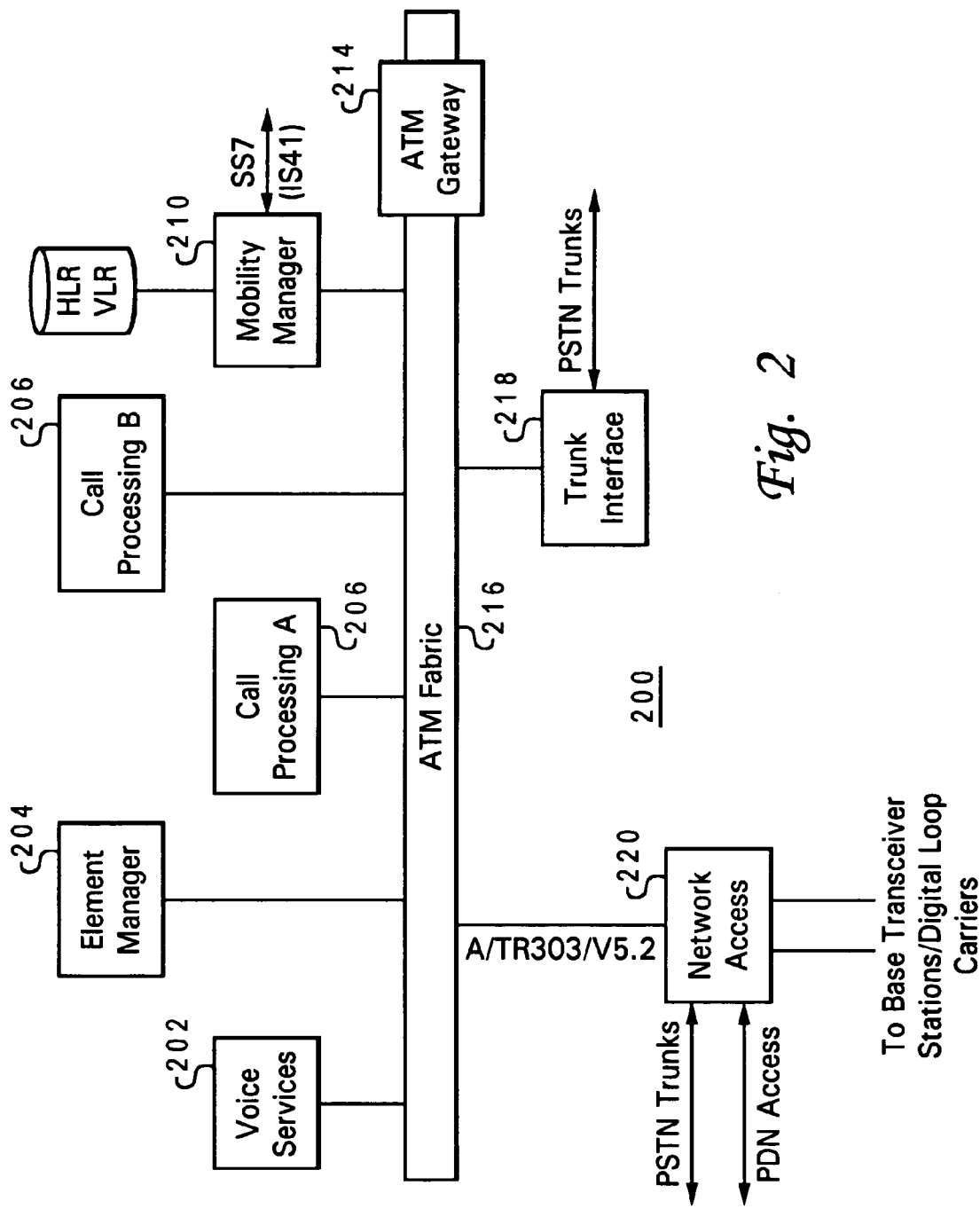
FIG. 2 illustrates a block diagram of a functional topology for an integrated wireless/wireline network, in accordance with a preferred embodiment of the present invention.

FIG. 2 illustrates a block diagram of a functional topology 200 for an integrated wireless/wireline network, in accordance with a preferred embodiment of the present invention. The topology outlined in FIG. 2 includes specific functional entities. Voice Services Function 202, which is a centralized network resource that provides voice processing functions, including announcements, bridges, voice recognition/authentication, and advanced services support. Voice Services Function 202 is linked to ATM fabric 216, which underlies ATM Gateway 214. By constructing the network out of broadband/ATM components, the network is capable of flexibly carrying payloads ranging from narrowband voice/data to broadband multimedia data. The topology depicted in FIG. 2, includes an Element Manager Function 204, also connected to ATM fabric 216, that provides operations, administration, maintenance, and provisioning functions for the network. The element management architecture facilitates real-time management of resources required for call processing.

Figure 3:
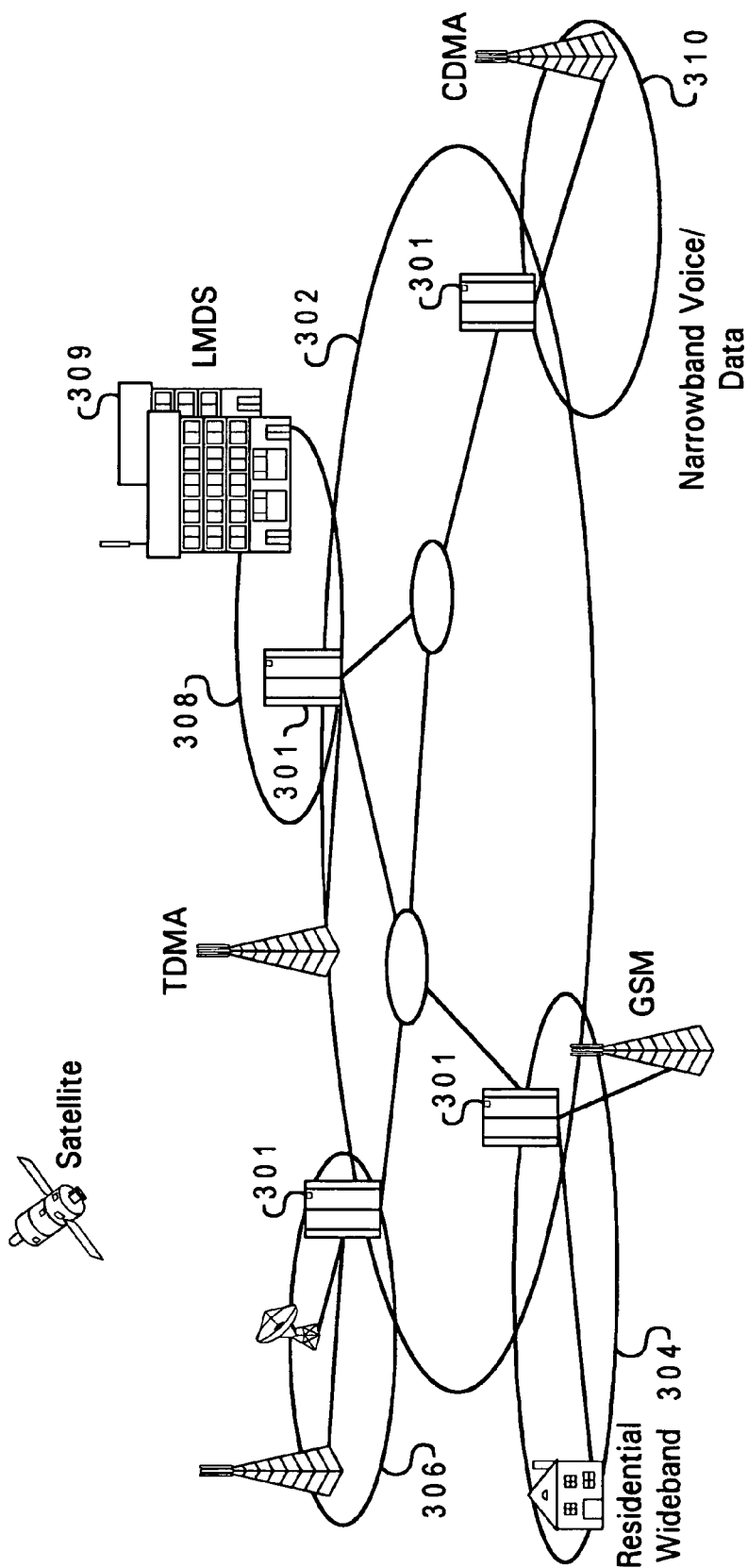
FIG. 3 depicts a pictorial representation of a communications network in accordance with a preferred embodiment of the present invention.

The topology outlined in FIG. 2 additionally includes a Call Processing Function A 206, which provides service logic for supporting calls to and from the ATM fabric. Multiple call processing servers can exist in, a given network. In FIG. 2, for example, an additional call process function (i.e., Call Processing Function B 208) is also depicted. The topology outlined in FIG. 2 also includes a Mobility Manager Function 210, connected to ATM Fabric 216. Mobility Manager Function 210 provides HLR/VLR access as well as IS-41 messaging links. The acronym "HLR" represents the term "Home Location Register," a defined network entity. The HLR is a database of local subscriber data, including provisioning, service, and location information. The acronym VLR represents the term "Visitor's Location Register," which is also a defined network entity. The VLR is the location register other than the HLR, which is utilized by an MSC (i.e., Mobile Switching Center) to retrieve information for handling calls to or from a visiting subscriber. An example of an MSC is depicted in FIG. 3 as MSC 307. IS-41 messaging links are based on protocols outlined in the Electronic Industries Association/ Telecommunications Industry Association (EIA/TIA) Standard IS-41 document (also referred to sometimes as "ANSI-41").

The topology 200 depicted in FIG. 2 additionally includes a Network Access Function 220 that consolidates traffic to and from access devices (e.g., base transceiver stations, digital loop carriers, and so forth), and interfaces these access devices with ATM Fabric 216. other primary functions associated with Network Access Function 220 include signal processing, hand-off control, speech processing, data/voice interworking, and access to wireline communications networks (Public Switched Telephone Network (PSTN) and Public Data Network (PDN)). The communications network is inherently capable of supporting either wireless or wireline services (or both). Various access interface standards can be adapted at the edge of the network via Network Access Function 220, which is generally referred to as "NAF". Consequently, the infrastructure is capable of supporting any or all access standards, either alternatively or concurrently, which promotes the mixing of wireless and wireline access as well as incorporating multiple wireless and wireline standards.

Access technology is adapted to the communications network at Network Access Function 220. The architecture outlined in FIG. 2 optimally addresses several primary challenges, including the ability to fully integrate wireless and wireline access infrastructures, while providing a generic infrastructure capable of supporting various wireless/wireline access standards. In addition, the structure depicted in FIG. 2 provides the ability to carry variable bandwidth multimedia payloads efficiently. By definition, the structure outlined in FIG. 2 applies to both fixed and mobile applications. Those skilled in the art will appreciate that mobility is flexible, and is chiefly a function of the type of access and the service being provided.

Referring to FIG. 3, a pictorial representation of a communications network in accordance with a preferred embodiment of the present invention is depicted. System 300 consists of multiple edge switches 301 that provide connection to ATM fabric 302 (see FIG. 2 for details). Various cellular frequency modulation schemes (TDMA, CDMA and GSM) are connected to ATM fabric 302 via edge switches 301. Residential wideband data 304 may be transmitted to and from ATM fabric 302 via edge switch 301. Satellite 306 high speed transmission may be connected to the ATM fabric through edge switch 301 for transmission to households, cellular devices, etc. Local Multipoint Distribution System (LMDS) 309 is a method of distributing TV signals to households in a local area. In addition to receiving or transmitting TV signals via edge switch 301, LMDS is capable of handling voice and high speed data 308. Narrowband voice/data 310 is used to provide services such as paging, voice paging wireless data services.

Figure 4:
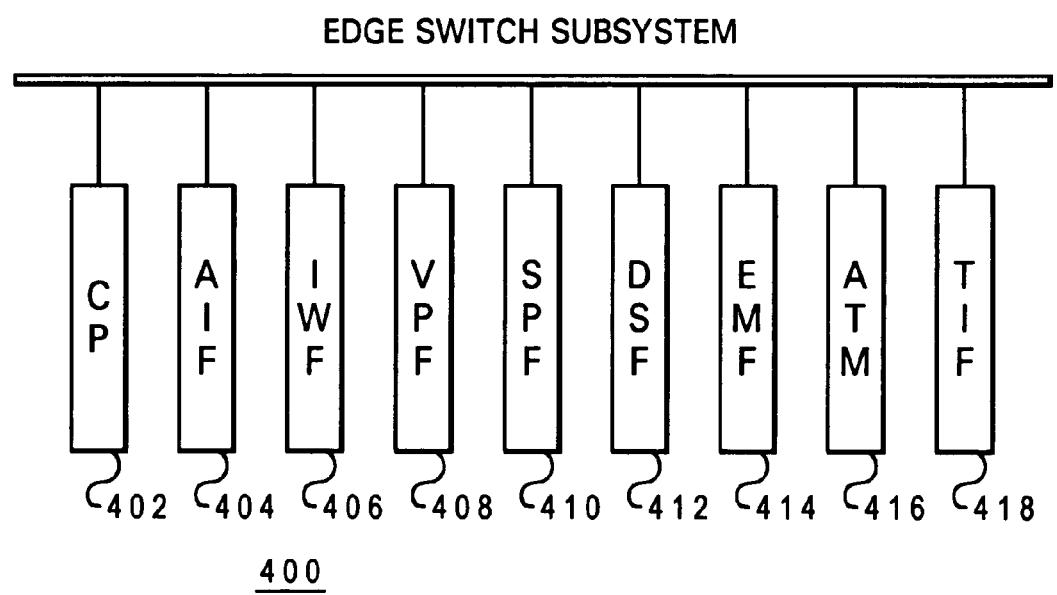
FIG. 4 illustrates a high-level block diagram of an ATM Gateway in accordance with a preferred embodiment of the present invention.

Referring to FIG. 4, a high-level block diagram of an ATM Gateway in accordance with a preferred embodiment of the present invention, is illustrated. ATM Gateway 400 is comprised of an edge switch subsystem with multiple functions integrated into the switch. Call Processing (CP) 402 provides the logic to process and direct incoming signals to the various Gateway functions. Access Interface Function (AIF) 404, Interworking Function (IWF) 406, Voice Processing Function (VPF) 408, is a centralized network resource that provides voice processing functions including bridges, announcements, voice recognition and authentication, and advanced services support. Signal Processing Function (SPF) 410, provides the logic and necessary conversion functions for converting incoming and outgoing signals. Digital Service Level Zero (DS-0) Function (DSF) 412, is utilized to digitize voice transmission using pulse code modulation. Element Management Function (EMF) 414, connected to the ATM fabric, provides operation, administration, maintenance and provisioning functions for the network. Asynchronous Transfer Mode Interface function (ATM) 416, provides the interface for the ATM fabric. Trunk interface function (TIF) 418, provides an interface between the ATM fabric, the edge switch and wireline circuits thus, integrating wireline and wireless communication networks.

Figure 5:
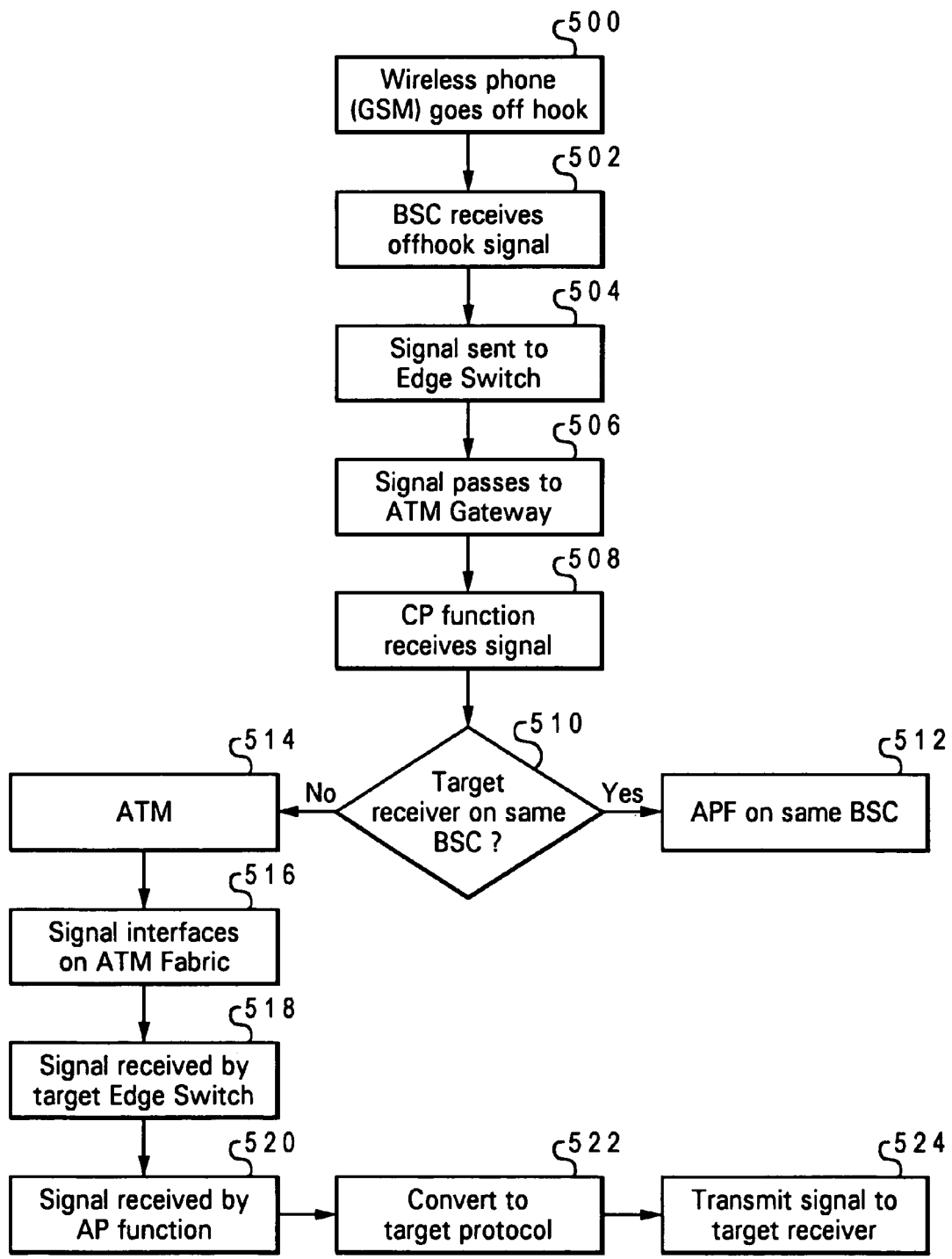
FIG. 5 illustrates a high-level flow chart of a method for implementing a functional topology in a communications network for an integrated wireless/wireline network, in accordance with a preferred embodiment of the present invention.

Referring now to FIG. 5, a high-level flow chart of a method for implementing a functional topology in a communications network for an integrated wireless/wireline network, in accordance with a preferred embodiment of the present invention, is depicted. The process begins with step 500, which depicts a wireless phone going offhook. In this illustration a GSM wireless telephone is the transmitting device and the target receiving device may be a cellular telephone that utilizes CDMA or TDMA. The devices may also be wireless, or wireline, modems. The process proceeds to step 502, which illustrates a Base Station Controller (BSC) receiving the off hook signal. The BSC manages resources in GSM and includes Base Transceiver station. The process then passes to step 504, which depicts the signal received by the BSC being sent to an edge switch interface (in the present invention, BSC functions are integrated into the edge switch). The process continues to step 506, which illustrates the signal being passed to the ATM Gateway (see FIG. 2).

Next, the process passes to step 508, which depicts the Call Processing function being initiated upon receiving the signal. The call processing function provides service logic for supporting calls (note that multiple call processing services can exist in a given communications network) and directs the incoming signal to the appropriate "translating" device contained within the edge switch. The signal, if necessary is converted to the target receiver protocol. The process then proceeds to step 510, which illustrates a determination of whether the target receiver is on the same BSC. If the target receiver is on the same BSC as the originating telephone, the process passes to step 512, which depicts the signal being routed to the APF (DEFINE) within the ATM Gateway. The process then moves to step 524, which illustrates the signal being transmitted by the BSC to the target receiver.

Returning to step 510, if the target receiver is not on the same BSC as the originating device the process passes instead to step 514, which illustrates the signal being passed to the ATM interface. The process then proceeds to step 516, which depicts the signal interfacing with the ATM fabric. The signal is transmitted on the ATM fabric to an edge switch that services the target device. The process continues to step 518, which illustrates the signal being received by the target edge switch (which is also an edge switch with an ATM gateway). The process then passes to step 520, which depicts the Call Processing of the signal received by the AP function. The Call Processing function directs the signal to the proper protocol "translating" device, if necessary. The process then proceeds to step 522, which illustrates the proper device converting the signal to the targets protocol. Next the process passes to step 524, which depicts the converted signal transmitted to the target receiver.

The ATM Gateway contains multiple conversion devices as defined in FIG. 4. The Call Processing function routes an incoming signal to a device that converts the incoming signal to an outgoing signal that is compatible with a targeted receiver. The Gateway queries the targeted receiver and determines the necessary conversion to make to communicate with the receiver and routes the signal through a converter before actual transmission.

The process described in FIG. 5 integrates wireless and wireline infrastructures utilizing an ATM infrastructure integrated with a communications network. The process also provides an infrastructure capable of supporting various air/wire access standards, and additionally provides the ability to carry variable bandwidth multimedia payloads efficiently. Those skilled in the art will appreciate that the process depicted in FIG. 5 is also applicable to both fixed and mobile applications.

It can be appreciated by those skilled in the art that FIG. 5 presents a sequence of steps leading to a desired result. The steps generally require manipulation of physical quantities. Usually, these quantities take the form of electrical or magnetic signals capable of being stored, transferred, combined, compared, and otherwise manipulated. It has proven convenient at times by those skilled in the art, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as "linking," "transmitting," "designating," or "transferring", which are commonly associated with mental operations performed by a human operator. No such capability of a human operator is necessary or desirable in most cases in any of the operations described herein which form part of the present invention because the operations are machine operations. Useful machines for performing operations of a preferred embodiment of the present invention include data-processing systems such as general purpose digital computers or other similar devices. In all cases the distinction between the method operations in operating a computer and the method of computation itself should be borne in mind.

The present invention relates to method steps for processing electrical signals can be implemented via a computer. Such instructions can be maintained with a computer memory at a cellular telephone base station or a central broadcasting center from which such base stations receive instructions. Implementation of the method described herein is left to the discretion of a particular cellular telephone system designer.

It can be appreciated by one skilled in the art that the methods or processes described herein can be implemented as a program product, such as a control program residing within a computer memory and containing instructions that when executed, will carry out the operations depicted in the logic flow charts described herein. It is important to note that, while the present invention can be described in the context of a fully functional computer system, those skilled in the art can appreciate that the present invention is capable of being distributed as a program product in a variety of forms, and that the present invention applies equally, regardless of the particular type of signal-bearing media utilized to actually carry out the distribution. Examples of signal-bearing media include: recordable-type media, such as floppy disks, hard-disk drives and CD ROMs, and transmission-type media, such as digital and analog communication links.

Preferred implementations of the invention can include implementations to execute the method or methods described herein as a computer program product residing in a memory of microcomputer. Alternatively, a preferred embodiment of the present invention can include a program product residing in a microcomputer memory located at an MSC (i.e., "MSC" is an acronym for "mobile switching center"). An MSC typically controls system operations in cellular networks. For example, an MSC can control calls, track billing information, and locate cellular subscribers. The program product thus includes sets of instructions for executing the method and systems described herein. Until required by the microcomputer, the set of instructions may be stored as a computer-program product in another computer memory, for example, in a disk drive attached to the microcomputer (which may include a removable memory such as an optical disk or floppy disk for eventual use in the disk drive).

Further, the computer-program product can also be stored at another computer and transmitted when desired to the user's workstation by a network or by an external network. One skilled in the art can appreciate that the physical storage of the sets of instructions changes the medium upon which it is stored so that the medium carries computer-readable information. The change may be electrical, magnetic, or some other change. While it is convenient to describe the invention in terms of instructions, symbols, characters, or the like, the reader should remember that all of these and similar terms should be associated with the appropriate physical elements.

The embodiments and examples set forth herein are presented in order to best explain the present invention and its practical application and to thereby enable those skilled in the art to make and utilize the invention. However, those skilled in the art will recognize that the foregoing description and examples have been presented for the purposes of illustration and example only. The description as set forth is not intended to be exhaustive or to limit the invention to the precise form disclosed. Many modifications and variations are possible in light of the above teaching without departing from the spirit and scope of the following claims.

What is claimed is:

1. A method for efficiently integrating wireless and wireline functions within a communications network, comprising the steps of:

integrating an asynchronous transfer mode infrastructure with said communications network;

linking said wireless and wireline functions to and from said communications network by transferring said wireless and wireline data to said asynchronous transfer mode infrastructure from a network access function within a network edge switch; and transmitting both wireless and wireline data to said network access function to allow wireless and wireline data to flow to and from said communications network;

determining target recipients for each wireless and wireline data received in a first communication protocol; and converting within said network access function said wireless and wireline data to a second communication protocol appropriate for said target recipient.

2. The method of claim 1, further comprising:
utilizing multiple functions within said network access function for consolidating and interfacing signal traffic to and from said communications network.

3. The method of claim 1, wherein the step of integrating an asynchronous transfer mode infrastructure with said communications network, further comprises: integrating an asynchronous transfer mode infrastructure with said communications network, wherein said asynchronous transfer mode infrastructure comprises an asynchronous transfer mode fabric interfaced with an asynchronous transfer mode gateway.

4. A system for efficiently integrating wireless and wireline functions within a communications network, comprising:

said communications network;

an asynchronous transfer mode infrastructure for transmitting signals within said communications network;

a network edge switch for linking said wireless and wireline functions to and from said communications network by transfer said wireless and wireline data to said asynchronous transfer mode infrastructure from a network access function within said network edge switch;

transmitting means for transmitting both wireless and wireline data to said network access function to allow wireless and wireline data to flow to and from said communications network;

means for determining target recipients for each wireless and wireline data received in a first communication protocol; and means for converting within said network access function said wireless and wireline data to a second communication protocol appropriate for said target recipient.

5. The system of claim 4, further comprising:
multiple functions within said network access function for consolidating and interfacing signal traffic to and from said communications network.

6. The system of claim 5, wherein integrating an asynchronous transfer mode infrastructure with said communications network, further comprises:

integrating an asynchronous transfer mode infrastructure with said communications network, wherein said asynchronous transfer mode infrastructure comprises an asynchronous transfer mode fabric interfaced with an asynchronous transfer mode gateway.

7. A program of instructions, the instructions stored on a computer readable media associated with a telecommunication system for efficiently integrating wireless and wireline functions within a communications network, comprising:

instructions within said computer readable media for integrating an asynchronous transfer mode instructions with said communications network;

instructions within said computer readable media for linking said wireless and wireline functions to and from said communications network by transferring said wireless and wireline data to said asynchronous transfer mode infrastructure from a network access function within a network edge switch;

instructions within said computer readable media for transmitting both wireless and wireline data to said network access function to allow wireless and wireline data to flow to and from said communications network;

instructions within said computer readable media for determining target recipients for each wireless and wireline data received in a first communication protocol; and instructions within said computer readable media for converting within said network access function said wireless and wireline data to a second communication protocol appropriate for a target recipient.

8. The program of instructions of claim 7, further comprising:

instructions within said computer readable media for utilizing multiple functions within said network access function for consolidating and interfacing signal traffic to and from said communications network.

9. The program of instructions of claim 7, wherein instructions for integrating an asynchronous transfer mode infrastructure with said communications network, further comprises: instruction with said computer readable media for integrating an asynchronous transfer mode infrastructure with said communications network, wherein said asynchronous transfer mode infrastructure comprises an asynchronous transfer mode fabric interfaced with asynchronous transfer mode gateway.

* * * * *